United States Patent
Daly et al.

(10) Patent No.: US 7,837,030 B2
(45) Date of Patent: Nov. 23, 2010

(54) APPARATUS FOR AND METHOD OF MOUNTING AND LOCKING DEVICES TO CONVEYOR BELT SYSTEMS

(75) Inventors: James L. Daly, Kewanee, IL (US); Majid Jameel Jabber, Toulon, IL (US); Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 125 days.

(21) Appl. No.: 12/234,351

(22) Filed: Sep. 19, 2008

(65) Prior Publication Data

US 2010/0072033 A1 Mar. 25, 2010

(51) Int. Cl.
*B65G 21/08* (2006.01)
(52) U.S. Cl. .................. 198/861.1; 198/822
(58) Field of Classification Search .......... 198/860.1, 198/860.2, 861.1, 820, 822, 828
See application file for complete search history.

(56) References Cited

U.S. PATENT DOCUMENTS

| | | | |
|---|---|---|---|
| 3,259,227 A | 7/1966 | Steinmetz | |
| 4,519,723 A * | 5/1985 | Kusmierz | 198/860.1 |
| 5,421,451 A * | 6/1995 | Easton | 198/860.1 |
| 5,490,592 A * | 2/1996 | Best et al. | 198/812 |
| 5,590,757 A * | 1/1997 | Walter et al. | 198/860.2 |
| 6,012,568 A * | 1/2000 | Kane | 198/861.1 |
| 6,247,581 B1 * | 6/2001 | Oswald et al. | 198/861.1 |
| 6,427,828 B1 | 8/2002 | East et al. | |
| 6,454,083 B2 | 9/2002 | Burkhart et al. | |
| 6,543,607 B2 | 4/2003 | Fischer et al. | |
| 7,090,427 B2 * | 8/2006 | Petratto | 198/860.1 |
| 7,114,615 B1 * | 10/2006 | Karpy | 198/860.1 |
| 7,467,707 B1 * | 12/2008 | Gabhart | 198/818 |
| 7,497,326 B2 * | 3/2009 | McGuire et al. | 198/861.1 |
| 2002/0011400 A1 * | 1/2002 | Burkhart et al. | 198/818 |
| 2004/0079621 A1 | 4/2004 | Mott | |

OTHER PUBLICATIONS

Installation Instructions for Martin Trac-Mount Idlers, admitted prior art, 2 pages.

* cited by examiner

*Primary Examiner*—James R Bidwell
(74) *Attorney, Agent, or Firm*—Thompson Coburn LLP; Clyde L. Smith

(57) ABSTRACT

A bulk material conveyor belt system comprises a belt, a track mounted device, and a support device. The track mounted device comprises a first track. The support device comprises a second track and a locking device. The second track is engaged with the first track in a manner such that the support device limits relative movement between the track mounted device and the belt while the support device also allows the track mounted device to slide relative to the support device along a path defined by the first and second tracks. The locking device comprises a movable portion that is movably attached to the second track and that can selectively bias the first track in a direction other than along the path in a manner creating sufficient friction between the first and second tracks that renders the first and second tracks immovable relative to each.

14 Claims, 9 Drawing Sheets

APPARATUS FOR AND METHOD OF MOUNTING AND LOCKING DEVICES TO CONVEYOR BELT SYSTEMS

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to bulk material belt conveyor systems. More specifically, this invention pertains to a tracking system that allows devices to be quickly assembled and secured to a conveyor belt system via a locking tracks.

2. General Background Technology

All bulk material belt conveyor system comprise a belt that extends in a continuous loop around rollers. The upper portion of the continuous loop can be referred to as a transfer run and the lower portion of the continuous loop can be referred to as the return run. Bulk material belt conveyor systems also typically comprise various devices mounted either within the continuous loop, above the transfer run, or beneath the return run. For example, on the return run, the belt of a conveyor system is often supported from beneath by return rollers, which are typically idler rollers that simply roll against the belt. Additionally, devices such as scraper blades and pinch guards may be mounted beneath the return run. Within the continuous loop, devices such as tail plows, impact bars and rollers, and sealing bars are often mounted. Above the transfer run, devices such as sprayers, vacuums, and kick boards may be mounted. All such devices require maintenance which often requires their removal from the conveyor belt system.

SUMMARY OF THE INVENTION

The present invention provides for a tracked mounting system that incorporates a locking device that allows devices to be quickly and easily assembled and locked to conveyor belt systems. In some cases, the invention allows for components to be removed and assembled to conveyor systems without requiring the stoppage of the conveyor belt systems.

In one aspect of the invention, a bulk material conveyor belt system comprises a belt, a track mounted device, and a support device. The track mounted device comprises a first track. The support device comprises a second track and a locking device. The second track is engaged with the first track in a manner such that the support device limits relative movement between the track mounted device and the belt while the support device also allows the track mounted device to slide relative to the support device along a path defined by the first and second tracks. The locking device comprises a movable portion that is movably attached to the second track such that it is movable between locking and unlocking positions. The locking device biases the first track in a direction other than along the path in a manner creating sufficient clamping force or friction between the first and second tracks that renders the first and second tracks immovable relative to each other when the movable portion of the locking device is in the locking position. In contrast, the locking device allows relative movement between the first and second tracks along the path when the movable portion of the locking device is in the unlocking position.

Another aspect of the invention pertains to a method of attaching a track mounted device to a bulk material conveyor belt system. The bulk material conveyor belt system comprises a belt that forms a continuous loop. The method comprises accessing a track mounted device. The track mounted device comprises a first track. The method also comprises accessing a support device. The support device comprises a second track and a locking device. Still further, the method comprises steps of engaging the first track with the second track in a manner such that the support device limits relative movement between the track mounted device and the belt, and sliding the track mounted device relative to the support device along a path defined by the first and second tracks. In addition, the method further requires actuating the locking device of the support device in a manner creating sufficient friction or clamping force between the first and second tracks that renders the first and second tracks immovable relative to each other.

Further features and advantages of the present invention, as well as the operation of various embodiments of the present invention, are described in detail below with reference to the accompanying drawings.

Figure 1:
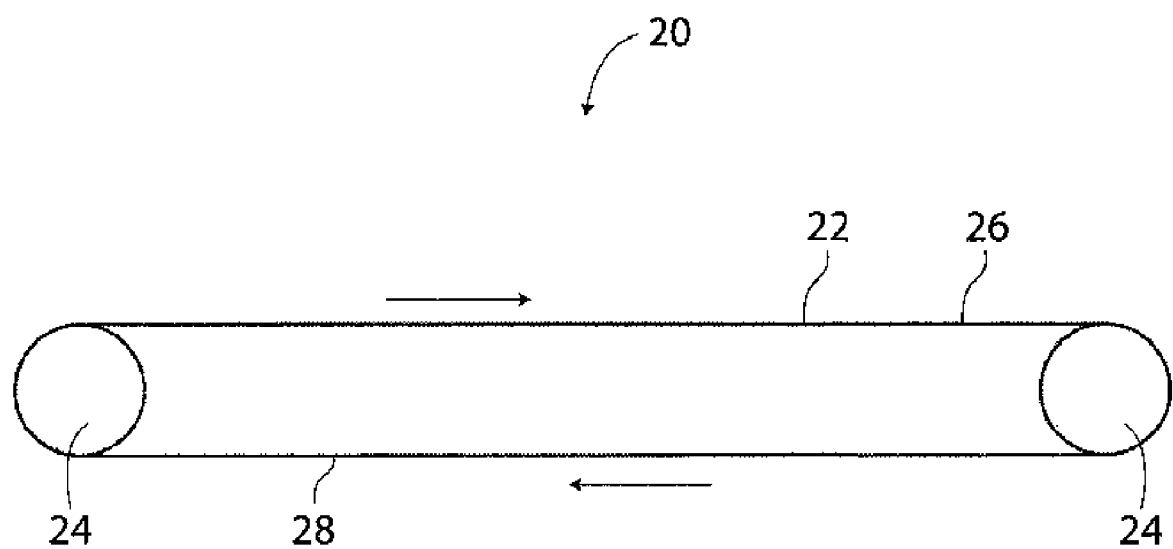
FIG. 1 is a schematic representation of a bulk material conveyor belt system.
Figure 2:
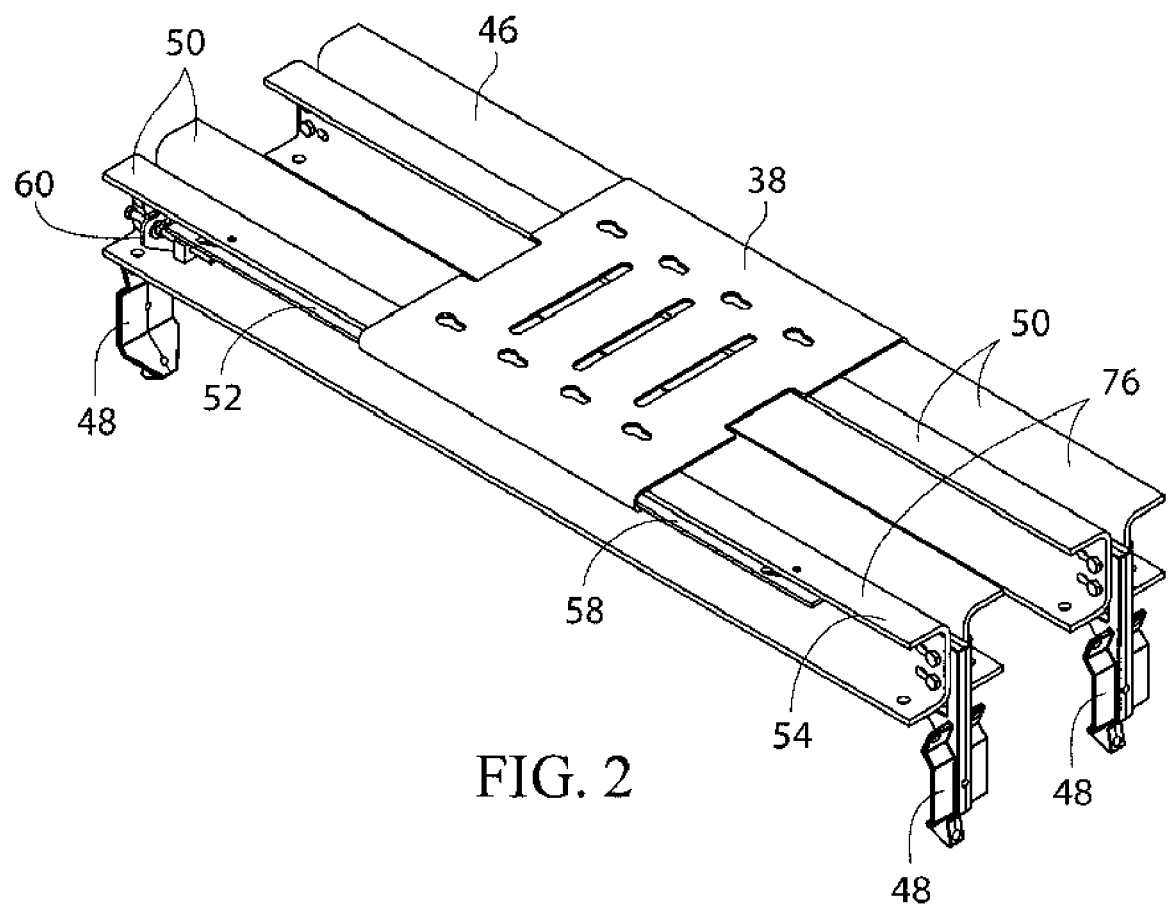
FIG. 2 is a perspective view of a tracked support structure and a mating tracked device platform in accordance with the invention.
Figure 3:
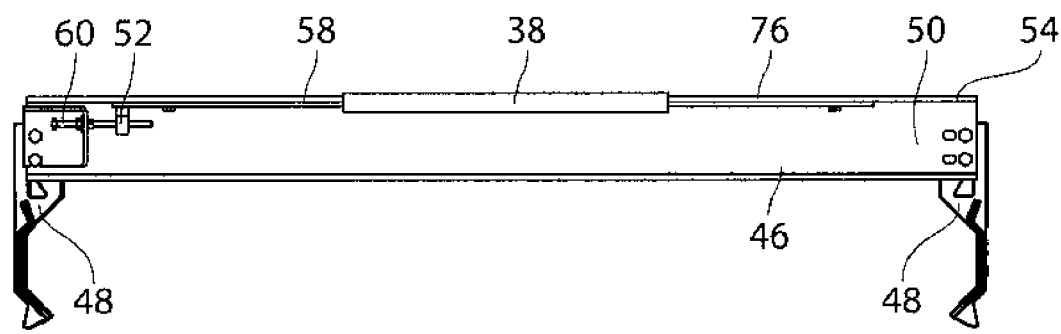
FIG. 3 is an elevation view of the portion of the tracked support structure and the mating tracked device platform shown in FIG. 2, as would be seen looking in a direction parallel to the transfer and return runs of the conveyor belt.
Figure 4:
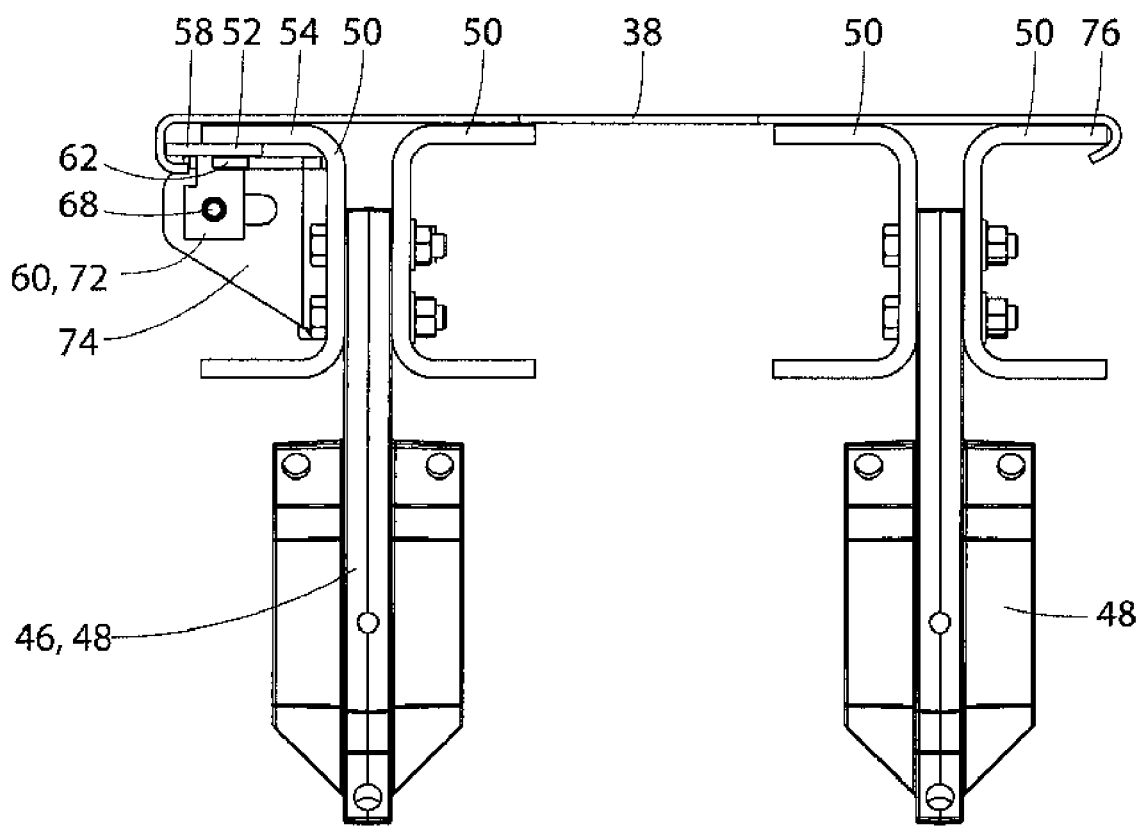
FIG. 4 is a side elevation view of the tracked support structure and the mating tracked device platform shown in FIGS. 2 and 3.
Figure 5:
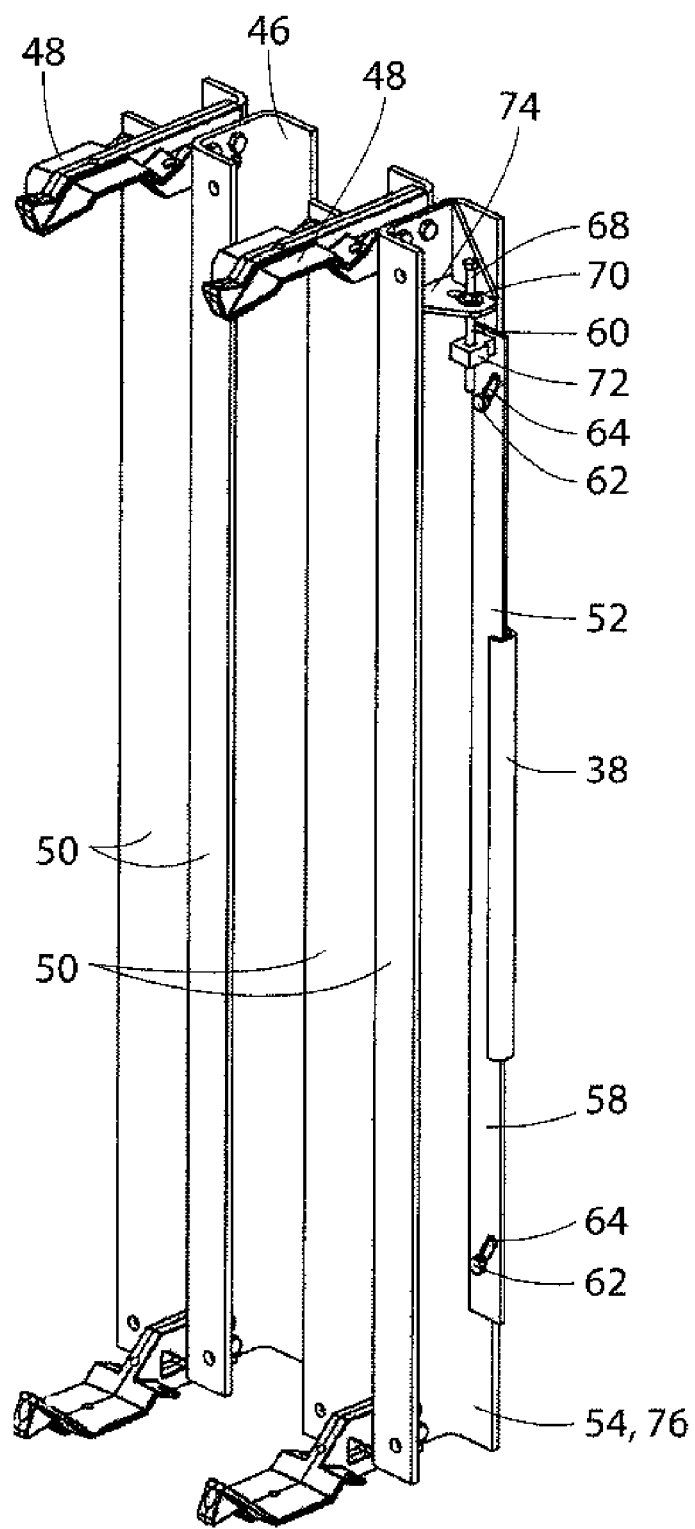
FIG. 5 is a perspective view of the tracked support structure and the mating tracked device platform shown in FIGS. 2-4, as would be seen from beneath and showing the locking device in its locked position.

Reference numerals in the written specification and in the drawing figures indicate corresponding items.

DETAILED DESCRIPTION OF THE INVENTION

A bulk material conveyor belt system is shown schematically in FIG. 1. The bulk material conveyor belt system 20 comprises a belt 22 that is driven about rollers 24 and forms a continuous loop. The upper portion of the continuous loop is referred to herein as the transfer run 26 and the lower portion of the continuous loop is referred to herein as the return run 28. Typically the belt 22 has a trough-like shape (not shown) as it passes along the transfer run 26. It may also have a flat or inverted trough-like shape along the return run 28.

FIGS. 2-8 depict a track mounted impact cradle 30 in accordance with the invention. Such an impact cradle 30 is often placed within the continuous loop formed by the belt to support the belt at the loading zone of the conveyor belt system. The impact cradle 30 comprises several tracked sections 32 (see FIGS. 7 and 8) upon which impact bars 34 are mounted. The center section 36 is generally flat and comprises primarily only a track 38 and impact bars 34. The side sections 40, referred to as wings, comprise a slanted support 42 that connects the impact bars to a two-piece track 44. The tracks 38, 44 are preferably c-shaped or a-shaped in cross-section.

Figure 9:
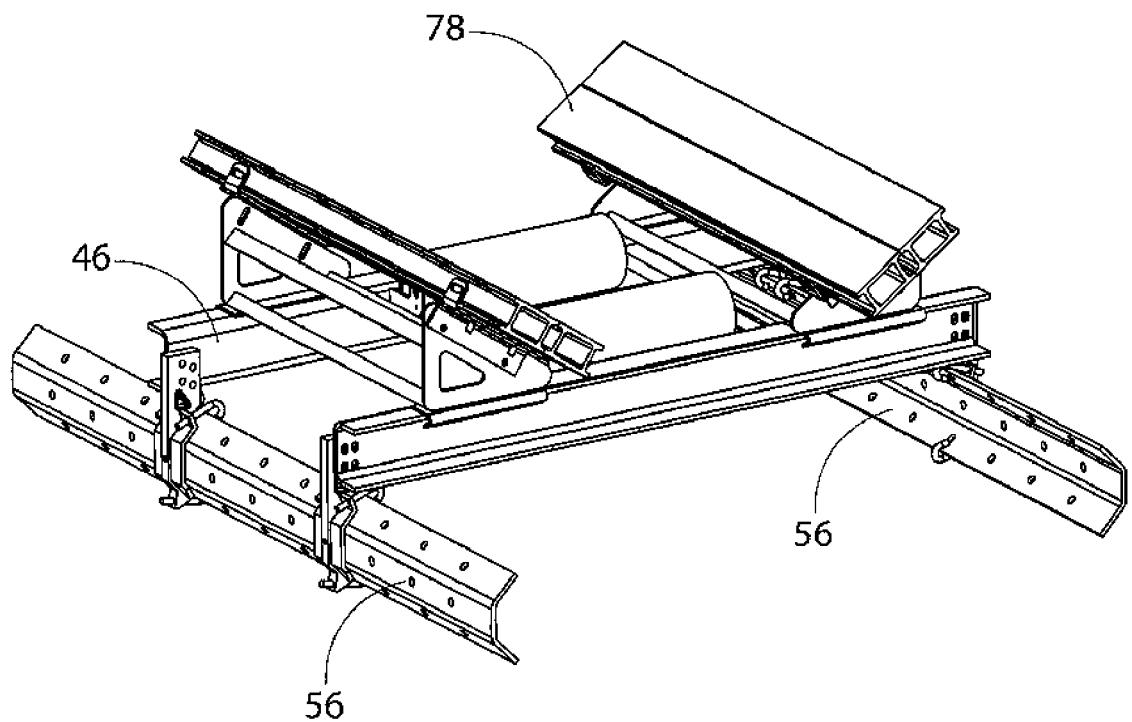
FIG. 9 is a perspective view depicting a track mounted edge sealing device with sealing bars and a center roll assembly, which are shown mounted the support frame of a bulk material conveyor belt system.

The support device 46 (shown with the track 38 of the center section 36 in FIGS. 2-6) comprises brackets 48, a plurality of steel c-channel members 50, and a locking device 52. Two of the c-channels members 50 are positioned back-to-back adjacent each other and are bolted to a pair of the brackets 48 positioned therebetween. Likewise, the other two c-channel members 50 are bolted to the other pair of brackets 48 in a similar manner. The locking device 52 is positioned partially within the channel of one of the c-channel members 50, along the c-channel member's upper flange 54. The brackets 48 allow the support device 46 to be mounted to the frame 56 (such as shown in FIG. 9) of a conveyor belt system.

The locking device 52 is preferably attached to the c-channel member 50 that is furthest downstream relative to the transfer run of the conveyor belt system, and comprises a movable portion 58, an actuator 60, and a pair of button head protrusions 62. The movable portion 58 is preferably a metal strip that has a plurality of elongate diagonal slots 64. The slots 64 preferably extend at about forty-five degrees relative to the sides of the strip. The button head protrusions 62 extend through the slots 64 and are preferably welded to the c-channel member 50 in a manner such that the longitudinal edges of the movable portion 58 are parallel to the longitudinal edges of the c-channel member 50. Thus, the button head protrusions 62 secure the movable portion 58 of the locking device 52 to the c-channel member 50. However, it should be appreciated that the movable portion 58 remains loosely attached to the c-channel member 50 in a manner such that it is able to move back and forth in the direction of its slots 64. The actuator 60 of the locking device 52 preferably comprises a threaded bolt 68, jam nuts 70, an internally threaded boss 72, and a slotted boss 74. The threaded boss 72 is preferably welded to the movable portion 58 of the locking device 52. The slotted boss 74 is preferably welded to the c-channel member 50. The threaded bolt 68 extends through the slotted boss 74 and is threadably engaged with the threaded boss 72. The jam nuts 70 are threaded on the threaded bolt 68 and are positioned on opposite sides of the slotted boss 74. By either turning the threaded bolt 68 relative to the threaded boss 72 or using the jam nuts 70 to move the threaded bolt relative to the non-threaded boss 74, the actuator 60 is able to force the movable portion 58 of the locking device 52 toward and away from the slotted boss 74. However, since the movable portion 58 is confined by the button head protrusions 62 to moving only diagonally along its slots 64, this also causes the movable portion 58 to translate more or less into and out of the channel of the respective c-channel member 50. Once the desired position of the movable portion 58 is established, the actuator can be secured or locked by means of tightening the jam nuts 70 against slotted boss 74.

Figure 6:
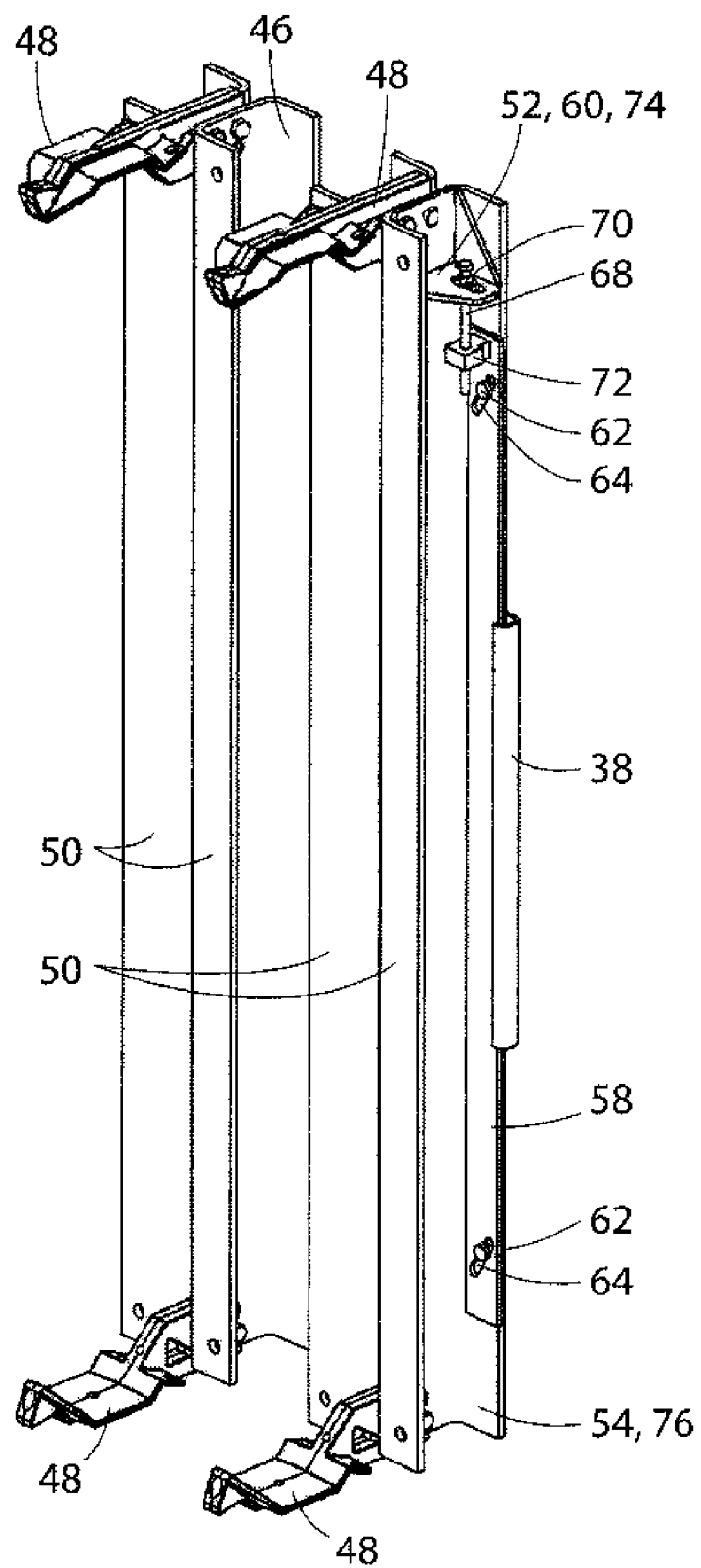
FIG. 6 is a perspective view similar to FIG. 5, but is shown with the locking device in the unlocked position.
Figure 7:
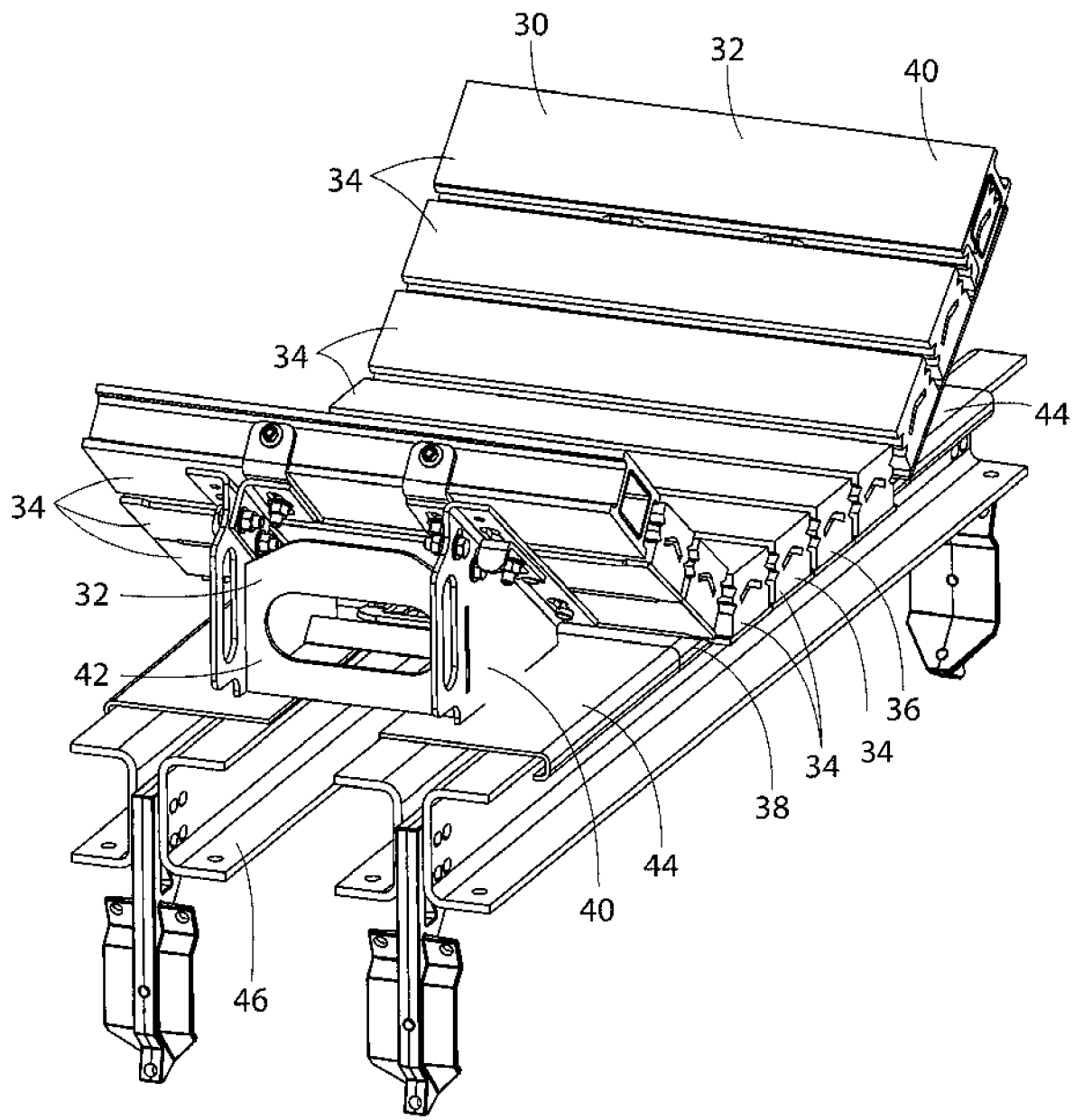
FIG. 7 is a perspective view depicting a track mounted impact cradle attached to a tracked support device.
Figure 8:
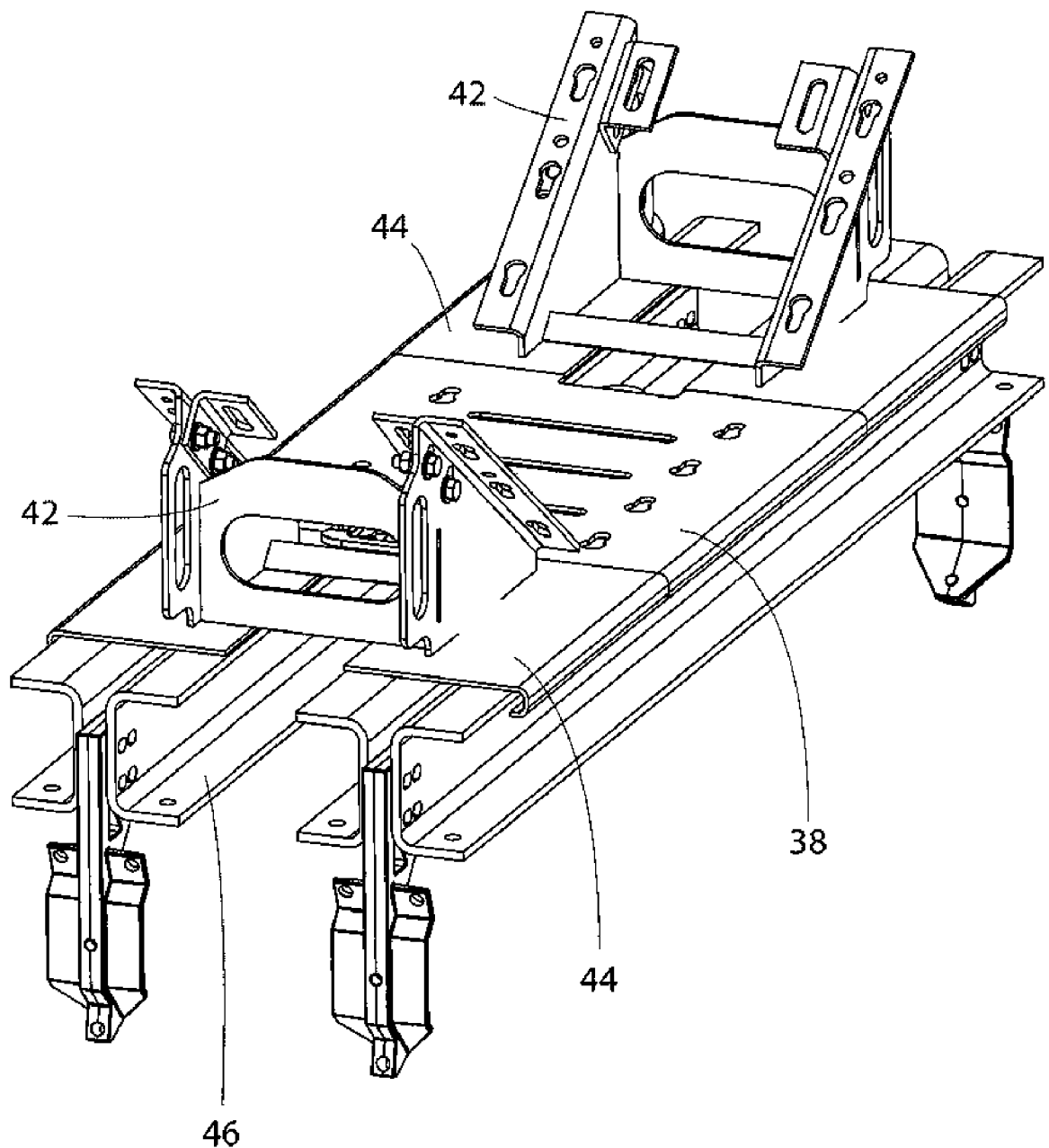
FIG. 8 is a perspective view of the track mounted impact cradle shown in FIG. 7 and is shown without the impact bars.

The outer most upper flanges 54 of c-channel members 50 on either end of the support device 46 form a track 76 having two oppositely protruding cantilevered flange portions. The c-shaped tracks 38, 44 of the tracked sections 32 of the impact cradle 30 are configured to extend partially around the track 76 of the support device 46 such that the track of the support device is captured by the tracks of the tracked sections of the impact cradle. When the locking device 52 is configured such that the movable portion 58 thereof is positioned at its most upstream limit (the unlocking position), the tracked sections 32 of the impact cradle 30 are able to slide loosely along the track 76 of the support device 46. The geometry of the tracked sections 32 and the track 76 is preferably configured such that track sections remain captured on the track 76 (except in the sliding direction) via interlocking geometry. However, the geometry can be such that tracked sections 32 can also be lifted off of track 76. As such, when the movable portion 58 of the locking device 52 is in the unlocking position (as shown in FIG. 6), the tracked sections 32 of the impact cradle 30 can be repositioned relative to the support device 46 or easily removed therefrom. When desired, the actuator 60 can be operated to force the movable portion 58 of the locking device 52 toward the slotted boss 74, which also forces the movable portion to move downstream. As the movable portion 58 does this, it engages the tracks 38, 44 of the tracked sections 32 of the impact cradle 30 and forces the tracked sections 32 in downstream direction. Eventually the upstream portions of the tracks 38, 44 of the tracked sections 32 engage firmly against the upstream portion of the track 76 of the support device 46 and the movable portion 58 of the locking device 52 engages firmly against the downstream portions of the tracks of the tracked sections. In this configuration, the movable portion 58 is referred to herein as being in its locking position (shown most clearly in FIGS. 4 and 5). With the movable portion 58 in this locking position, the biasing force exerted by the movable portion against the tracked sections 32 of the impact cradle 30 creates friction or clamping force between the tracked sections and the support device 46 that prevents any relative movement therebetween.

Figure 10:
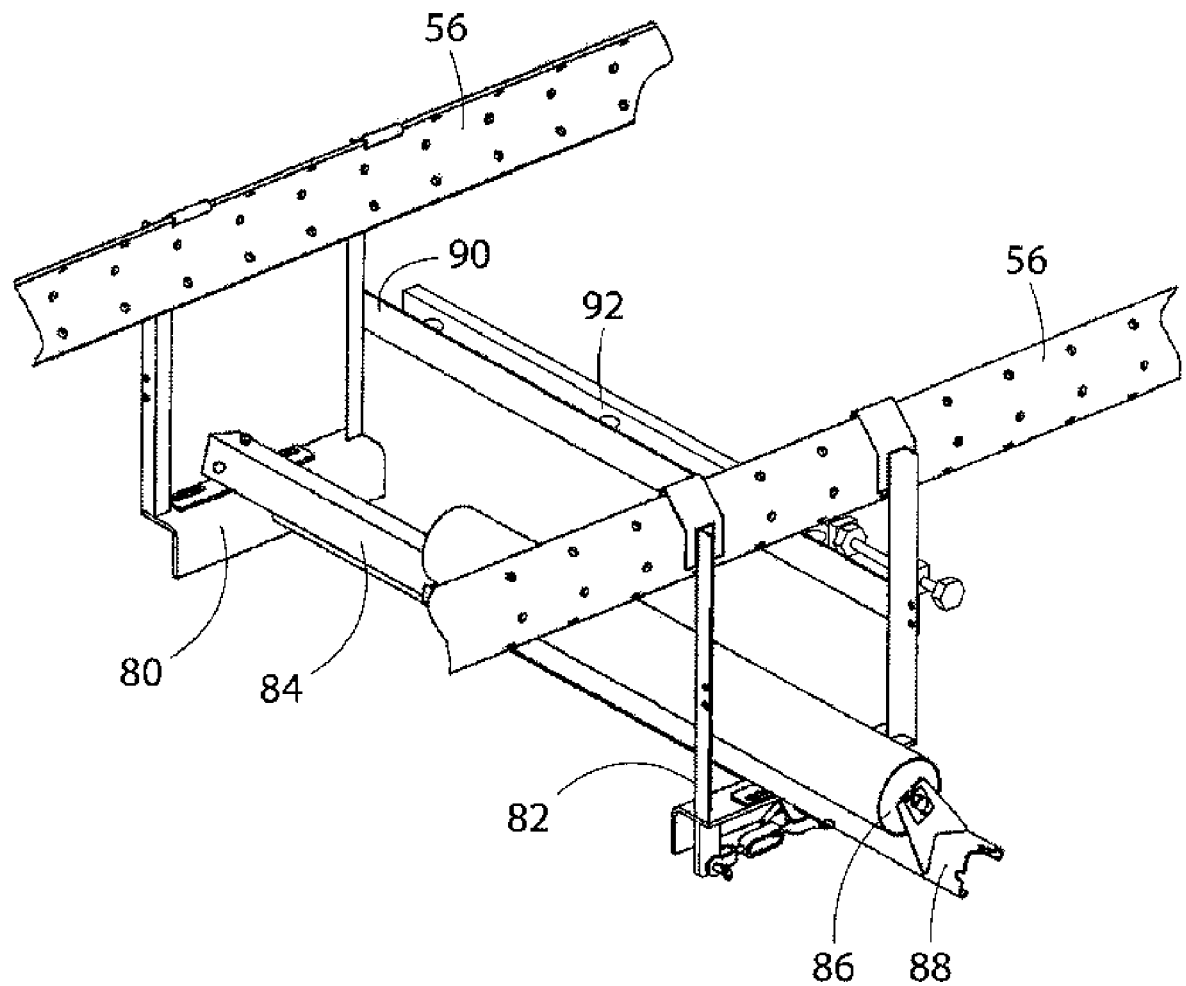
FIG. 10 is a perspective view depicting a track mounted return roller, shown being mounted to a tracked support device that is attached to the support frame of a bulk material conveyor belt system.

It should be appreciated the operation of the locking device 52 locks and unlocks all three tracked sections 32 of the impact cradle 30 simultaneously. It should also be appreciated that locking device 52 is operable from just one side of a conveyor belt system and does not require anyone to reach beneath the belt of the conveyor belt system. Still further, it should be appreciated that the general concept behind the locking device 52 described above can be implemented in connection with various conveyor system devices. For example, FIG. 9 depicts a track mounted sealing bar assembly 78 which can incorporate the same locking device described above. Additionally, the locking device can be incorporated on track mounted return roller assemblies like the one shown in FIG. 10. The track mounted return roller assembly 80 shown in FIG. 10 comprises a support device 82 that comprises a track 84 in the form of angle iron. The track mounted return roller 86 comprises a mating track 88 having a similar shape, but with its edges rolled over. Despite these differences, the locking device 52 described above can be utilized to lock and unlock the track mounted return roller 80 relative to the support device 82 in substantially the same manner.

In additional to serving as a locking mechanism, the locking device 52 can also serve other functions as well. For example, the track mounted return roller assembly 80 shown in FIG. 10 comprises a pinch guard 90, which can be made adjustable in height using a mechanism 92 identical to the locking device 52. The mechanism 92 allows the upper edge of the pinch guard 90 (which is formed by the mechanism 92 itself) to be raised or lowered such that it is a desired distance beneath the conveyor belt. Over time, the mechanism 92 can be adjusted as described to maintain it at the desired distance from the belt.

In view of the foregoing, it should be appreciated that the invention achieves the several advantages over prior art methods and devices.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A bulk material conveyor belt system comprising:
   a belt, the belt forming a continuous loop;
   a track mounted device, the track mounted device comprising a first track; and
   a support device, the support device comprising a second track and a locking device, the second track being engaged with the first track in a manner such that the support device limits relative movement between the track mounted device and the belt while the support device also allows the track mounted device to slide relative to the support device along a path defined by the first and second tracks, the locking device comprising a movable portion that is movably attached to the second track such that the movable portion is movable between locking and unlocking positions, the locking device biasing the first track in a direction other than along the path in a manner creating sufficient clamping force between the first and second tracks that renders the first and second tracks immovable relative to each other when the movable portion of the locking device is in the locking position, the locking device allowing relative movement between the first and second tracks along the path when the movable portion of the locking device is in the unlocking position.

2. A bulk material conveyor belt system in accordance with claim 1 wherein the first track has a length that extends along the path and the movable portion of the locking device engages the first track along the entirety of the length when the movable portion of the locking device is in the locking position.

3. A bulk material conveyor belt system in accordance with claim 1 wherein the track mounted device constitutes a first track mounted device, the bulk material conveyor belt system comprises a second track mounted device, the second track mounted device comprises a third track, the second track is engage with the third track in a manner such that the support device limits relative movement between the second track mounted device and the belt while the support device also allows the second track mounted device to slide relative to the support device along the path, the locking device biases the third track in a manner creating sufficient friction between the third and second tracks that renders the third and second tracks immovable relative to each other when the movable portion of the locking device is in the locking position, and the locking device allows relative movement between the third and second tracks along the path when the movable portion of the locking device is in the unlocking position.

4. A bulk material conveyor belt system in accordance with claim 1 wherein the direction constitutes a first direction, the locking device comprises an actuator, the movable portion of the locking device moves in a second direction between the locking and unlocking positions, the actuator exerts an actuator force that act in a third direction on the movable portion of the locking device when movable portion of the locking device is in the locking position, and the first, second, and third directions are distinct from each other.

5. A bulk material conveyor belt system in accordance with claim 4 wherein the first and third directions are generally perpendicular to each other and the third direction is parallel to the path.

6. A bulk material conveyor belt system in accordance with claim 4 wherein the actuator comprises a threaded member that threadably generates the actuator force.

7. A bulk material conveyor belt system in accordance with claim 1 wherein the first track has a c-shaped cross-section and the locking device biases the first track as recited from within the c-shaped cross-section.

8. A method of attaching a track mounted device to a bulk material conveyor belt system, the bulk material conveyor belt system comprising a belt that forms a continuous loop, the method comprising:
   accessing a track mounted device, the track mounted device comprising a first track;
   accessing a support device, the support device comprising a second track and a locking device;
   engaging the first track with the second track in a manner such that the support device limits relative movement between the track mounted device and the belt;
   sliding the track mounted device relative to the support device along a path defined by the first and second tracks;
   actuating the locking device of the support device in a manner creating sufficient clamping force between the first and second tracks that renders the first and second tracks immovable relative to each other.

9. A method in accordance with claim 8 wherein the track mounted device constitutes a first track mounted device, the method further comprises accessing a second track mounted device, the second track mounted device comprises a third track, the method still further comprises step of engaging the third track with the second track in a manner such that the support device limits relative movement between the second track mounted device and the belt, and sliding the second track mounted device relative to the support device along the path, and the step of actuating the locking device of the support device occurs in a manner creating sufficient friction between the third and second tracks that renders the third and second tracks immovable relative to each other.

10. A method in accordance with claim 8 wherein the recited steps are performed without reaching beneath the belt of the bulk material conveyor belt system.

11. A method in accordance with claim 8 wherein the recited steps are performed from solely one side of the bulk material conveyor belt system.

12. A method in accordance with claim 8 wherein the step of engaging the first track with the second track occurs in a manner such that the first track captures the second track and the first track can only be removed from the second track by sliding the track mounted device relative to the support device back along the path.

13. A method in accordance with claim 8 wherein the locking device of the support device comprises a threaded member and the step of actuating the locking device comprises rotating the threaded member.

14. A method in accordance with claim 8 wherein the locking device comprises a movable portion, the moveable portion is movably fixed to the second track, and the step of actuating the locking device of the support device occurs in a manner causing the movable portion to move relative to the second track and engage the first track.

* * * * *